United States Patent
Ashbacher

(10) Patent No.: US 11,206,446 B2
(45) Date of Patent: Dec. 21, 2021

(54) FRAME REPLACEMENT WITHOUT OVERRUN

(71) Applicant: Roku, Inc., San Jose, CA (US)

(72) Inventor: Andrew L. Ashbacher, Draper, UT (US)

(73) Assignee: ROKU, INC., San Jose, CA (US)

( * ) Notice: Subject to any disclaimer, the term of this patent is extended or adjusted under 35 U.S.C. 154(b) by 20 days.

(21) Appl. No.: 16/925,552

(22) Filed: Jul. 10, 2020

(65) Prior Publication Data
US 2020/0413131 A1 Dec. 31, 2020

Related U.S. Application Data

(63) Continuation of application No. 16/023,555, filed on Jun. 29, 2018, now Pat. No. 10,715,863.
(Continued)

(51) Int. Cl.
*H04N 21/44* (2011.01)
*H04N 21/8352* (2011.01)
(Continued)

(52) U.S. Cl.
CPC ..... *H04N 21/44008* (2013.01); *G06F 16/783* (2019.01); *G06K 9/00711* (2013.01);
(Continued)

(58) Field of Classification Search
CPC ......... H04N 21/44008; H04N 21/8352; H04N 21/44016; H04N 21/812; H04N 21/4307;
(Continued)

(56) References Cited

U.S. PATENT DOCUMENTS 8,335,786 B2 12/2012 Pereira et al.
8,577,077 B2 11/2013 Zhang
(Continued)

FOREIGN PATENT DOCUMENTS

EP 2822287 A1 1/2015
GB 2460844 A 12/2009
(Continued)

OTHER PUBLICATIONS

International Search Report, Application No. PCT/US2018/040371, dated Sep. 25, 2018, 18 pages.
(Continued)

*Primary Examiner* — James R Marandi
(74) *Attorney, Agent, or Firm* — McDonnell Boehnen Hulbert & Berghoff LLP

(57) ABSTRACT

A method for a frame certainty metric for automatic content recognition. The method includes determining a frame match between media device frames of a media device stream relative to broadcast frames of a broadcast media stream and determining whether to shift the frame match by determining the following: a first frame certainty metric based on a first media device fingerprint and a target broadcast fingerprint; a second frame certainty metric based on a second media device fingerprint sequentially adjacent the first media device fingerprint and the target broadcast fingerprint; a third frame certainty metric based on a third media device fingerprint sequentially adjacent the first media device fingerprint and the target broadcast fingerprint; and a greatest frame certainty metric. The method further includes identifying the media device fingerprint corresponding to the greatest frame certainty metric as a target media device fingerprint matching the target broadcast fingerprint.

20 Claims, 13 Drawing Sheets

Related U.S. Application Data

(60) Provisional application No. 62/527,305, filed on Jun. 30, 2017.

(51) Int. Cl.
*G06Q 30/02* (2012.01)
*H04N 21/81* (2011.01)
*G06K 9/62* (2006.01)
*G06K 9/00* (2006.01)
*G06F 16/783* (2019.01)
*H04N 21/43* (2011.01)
*H04N 21/2668* (2011.01)
*H04N 21/442* (2011.01)
*H04N 21/83* (2011.01)

(52) U.S. Cl.
CPC ....... *G06K 9/00744* (2013.01); *G06K 9/6215* (2013.01); *G06Q 30/02* (2013.01); *H04N 21/2668* (2013.01); *H04N 21/4307* (2013.01); *H04N 21/44016* (2013.01); *H04N 21/44204* (2013.01); *H04N 21/812* (2013.01); *H04N 21/83* (2013.01); *H04N 21/8352* (2013.01)

(58) Field of Classification Search
CPC ......... H04N 21/2668; H04N 21/44204; H04N 21/83; G06Q 30/02; G06K 9/6215; G06K 9/00711; G06K 9/00744; G06F 16/783
See application file for complete search history.

(56) References Cited

U.S. PATENT DOCUMENTS

| 9,510,044 | B1 | 11/2016 | Pereira et al. |
| 2010/0205049 | A1* | 8/2010 | Long ................. G06Q 30/0252 705/14.5 |
| 2014/0196085 | A1 | 7/2014 | Dunker et al. |
| 2014/0201769 | A1 | 7/2014 | Neumeier et al. |
| 2016/0234564 | A1 | 8/2016 | Holyoak |
| 2016/0316262 | A1 | 10/2016 | Chen |

FOREIGN PATENT DOCUMENTS

| JP | 2014215751 A | 11/2014 |
| WO | 2004080073 A2 | 9/2004 |
| WO | 2014145938 A1 | 9/2014 |
| WO | WO 2016/172711 A1 | 10/2016 |
| WO | 2016200622 A1 | 12/2016 |

OTHER PUBLICATIONS

Masihi Z. G. et al., "Content based Video Retrieval based on Approximate String Matching," IEEE Publication, Nov. 21, 2005, 4 pages.

\* cited by examiner

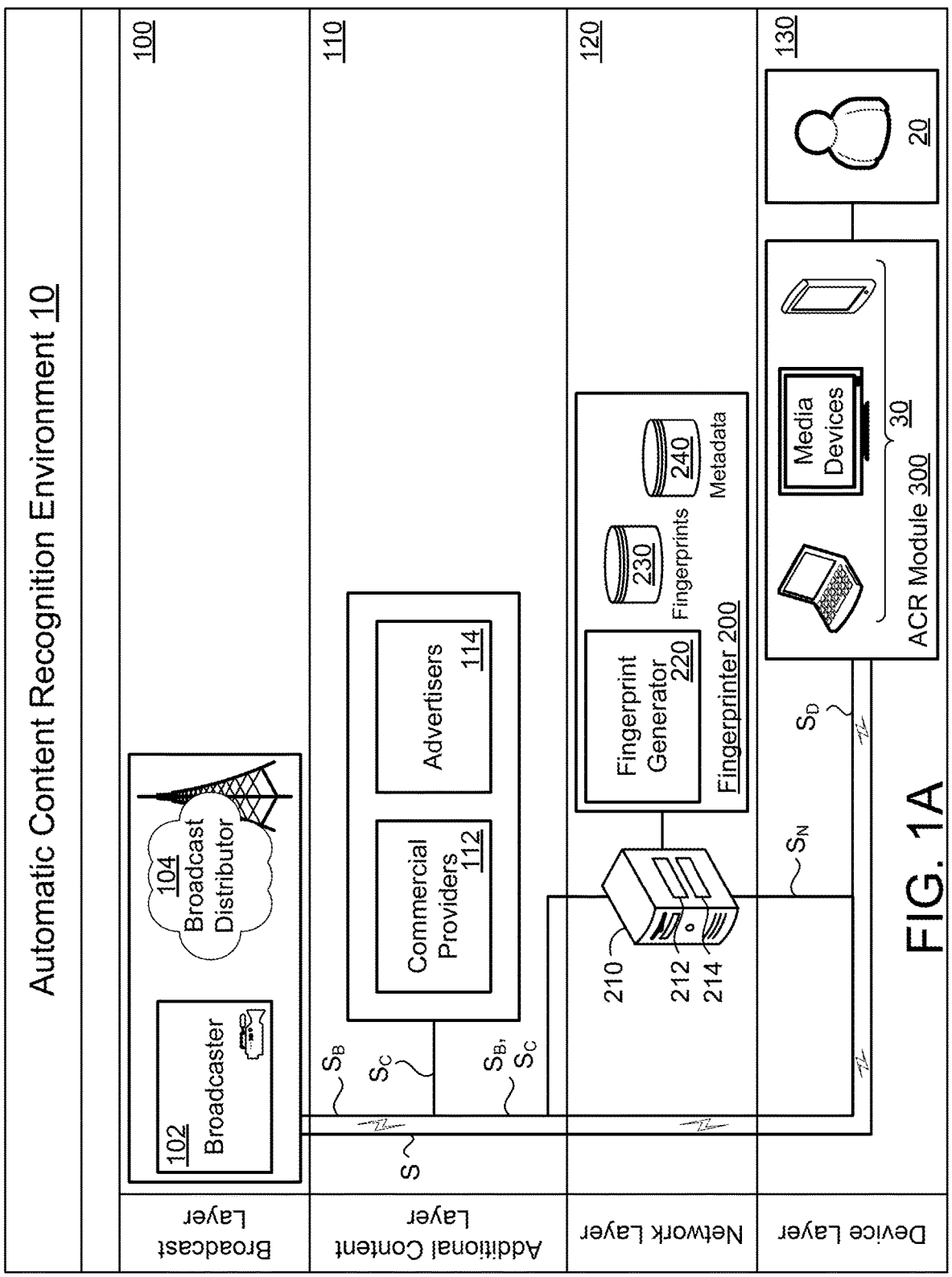

FRAME REPLACEMENT WITHOUT OVERRUN

CROSS REFERENCE TO RELATED APPLICATIONS

This application is a continuation of U.S. patent application Ser. No. 16/023,555, filed on Jun. 29, 2018, which claims priority to U.S. Provisional Application 62/527,305, filed on Jun. 30, 2017. The disclosures of these prior applications are considered part of the disclosure of this application and are hereby incorporated by reference in their entirety.

TECHNICAL FIELD

This disclosure relates to determining a frame certainty metric for automatic content recognition.

BACKGROUND

Media devices today are becoming more and more common and may range from fixtures in a home, such as a television, to mobile devices traveling along with a media consumer. Media devices, such as televisions, set-top-boxes, mobile phones, laptops, and tablets, may access and may retrieve media content from a variety of sources. For example, a media device may receive media content via satellite, over-the-air broadcasting, or streaming systems from a wired or a wireless connection. As the use of media devices continues to increase, media device connectivity to media content has also increased. With this growth, new media content markets have emerged and old media content market have adapted to understand and to provide contextually-relevant media content to the media consumer.

SUMMARY

One aspect of the disclosure provides a method for determining a frame certainty metric for automatic content recognition. The method includes receiving, at data processing hardware, broadcast fingerprints indicative of broadcast frames of a broadcast media stream. The method also includes receiving, at the data processing hardware, media device fingerprints indicative of media device frames of a media device stream at a corresponding media device. The method further includes determining, by the data processing hardware, a frame match between the media device frames of the media device stream relative to the broadcast frames of the broadcast media stream. The method includes determining, by the data processing hardware, whether to shift the frame match by determining: a first frame certainty metric based on a first media device fingerprint and a target broadcast fingerprint; a second frame certainty metric based on a second media device fingerprint and the target broadcast fingerprint, the second media device fingerprint sequentially adjacent to the first media device fingerprint; a third frame certainty metric based on a third media device fingerprint and the target broadcast fingerprint, the third media device fingerprint sequentially adjacent to the first media device fingerprint opposite the second media device fingerprint, each frame certainty metric being indicative of a quality of matching between the corresponding fingerprints; and a greatest frame certainty metric amongst the first frame certainty metric, the second frame certainty metric, and the third frame certainty metric. The method further includes identifying, by the data processing hardware, the media device fingerprint corresponding to the greatest frame certainty metric as the target media device fingerprint matching the target broadcast fingerprint.

Implementations of the disclosure may include one or more of the following optional features. In some implementations, the method includes determining, by the data processing hardware, whether the media device fingerprint corresponds to the target media device fingerprint. When the media device fingerprint corresponds to the target media device fingerprint, the method includes: identifying the frame certainty metric of the target media device fingerprint as the target frame certainty metric; determining a fourth frame certainty metric based on a fourth media device fingerprint and the target broadcast fingerprint, the fourth media device fingerprint sequentially adjacent to the target media device fingerprint; determining a fifth frame certainty metric based on a fifth media device fingerprint and the target broadcast fingerprint, the fifth media device fingerprint sequentially adjacent to the target media device fingerprint opposite the fourth media device fingerprint; and determining the greatest frame certainty metric amongst the target frame certainty metric, the fourth frame certainty metric, and the fifth frame certainty metric. In various implementations of the method, the frame certainty metric has more than one certainty level. In some examples, when the frame certainty metric has more than one certainty level, a first certainty level corresponds to the greatest frame certainty metric amongst the first frame certainty metric, the second frame certainty metric, and the third frame certainty metric. In other examples, a second certainty level identifies the greatest frame certainty metric amongst the target frame certainty metric, the fourth frame certainty metric, and the fifth frame certainty metric.

In some implementations, the method further includes determining, by the data processing hardware, whether the greatest frame certainty metric satisfies a frame certainty metric threshold. In some examples, when the greatest frame certainty metric satisfies the frame certainty metric threshold, the method includes associating, by the data processing hardware, a frame location corresponding to the target broadcast fingerprint with a media device frame corresponding to the target media device fingerprint. Optionally, the method further includes instructing, by the data processing hardware, advertisement replacement based on the frame location of the media device frame corresponding to the target media device fingerprint.

In some examples, when determining the frame match, the method further includes determining the frame match between the media device fingerprints relative to the broadcast device fingerprints. Optionally, when the media device has a media device frame rate and the broadcaster has a broadcast frame rate, the media device frame rate is less than the broadcast frame rate.

Another aspect of the disclosure provides a system for determining a frame certainty metric for automatic content recognition. The system includes data processing hardware and memory hardware in communication with the data processing hardware. The memory hardware stores instructions that when executed on the data processing hardware may cause the data processing hardware to perform operations. The operations include receiving broadcast fingerprints indicative of broadcast frames of the broadcast media stream, receiving media device fingerprints indicative of media device frames of the media device stream at the corresponding media device, and determining a frame match between the media device frames of the media device stream relative to the broadcast frames of the broadcast media stream. The system includes determining whether to shift the frame match by: determining the first frame certainty metric based on the first media device fingerprint and the target broadcast fingerprint, determining the second frame certainty metric based on the second media device fingerprint and the target broadcast fingerprint, the second media device fingerprint sequentially adjacent to the first media device fingerprint; determining the third frame certainty metric based on the third media device fingerprint and the target broadcast fingerprint, the third media device fingerprint sequentially adjacent to the first media device fingerprint opposite the second media device fingerprint, each frame certainty metric being indicative of a quality of matching between the corresponding fingerprints; and determining the greatest frame certainty metric amongst the first frame certainty metric, the second frame certainty metric, and the third frame certainty metric. The system further includes operations identifying the media device fingerprint corresponding to the greatest frame certainty metric as the target media device fingerprint matching the target broadcast fingerprint.

In various implementations of the system, the operations further include determining whether the media device fingerprint corresponds to the target media device fingerprint. When the media device fingerprint corresponds to the target media device fingerprint, the system further includes operations for the following: identifying the frame certainty metric of the target media device fingerprint as the target frame certainty metric; determining the fourth frame certainty metric based on the fourth media device fingerprint and the target broadcast fingerprint, the fourth media device fingerprint sequentially adjacent to the target media device fingerprint; determining the fifth frame certainty metric based on the fifth media device fingerprint and the target broadcast fingerprint, the fifth media device fingerprint sequentially adjacent to the target media device fingerprint opposite the fourth media device fingerprint; and determining the greatest frame certainty metric amongst the target frame certainty metric, the fourth frame certainty metric, and the fifth frame certainty metric. In various implementations of the method, the frame certainty metric has more than one certainty level. In some examples, when the frame certainty metric has more than one certainty level, a first certainty level corresponds to the greatest frame certainty metric amongst the first frame certainty metric, the second frame certainty metric, and the third frame certainty metric. In other examples, a second certainty level identifies the greatest frame certainty metric amongst the target frame certainty metric, the fourth frame certainty metric, and the fifth frame certainty metric.

In some examples, the system further includes operations determining whether the greatest frame certainty metric satisfies the frame certainty metric threshold. In some implementations, when the greatest frame certainty metric satisfies the frame certainty metric threshold, the operations may further include associating the frame location corresponding to the target broadcast fingerprint with the media device frame corresponding to the target media device fingerprint. Optionally, the operations further include instructing advertisement replacement based on the frame location of the media device frame corresponding to the target media device fingerprint.

In some operations of the system, determining the frame match further includes determining the frame match between the media device fingerprints relative to the broadcast device fingerprints. In some examples, when the media device has a media device frame rate and the broadcaster has a broadcast frame rate, the media device frame rate is less than the broadcast frame rate.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is a schematic view of an example of an automatic content recognition environment.

Like reference symbols in the various drawings indicate like elements.

DETAILED DESCRIPTION

Figure 1B:
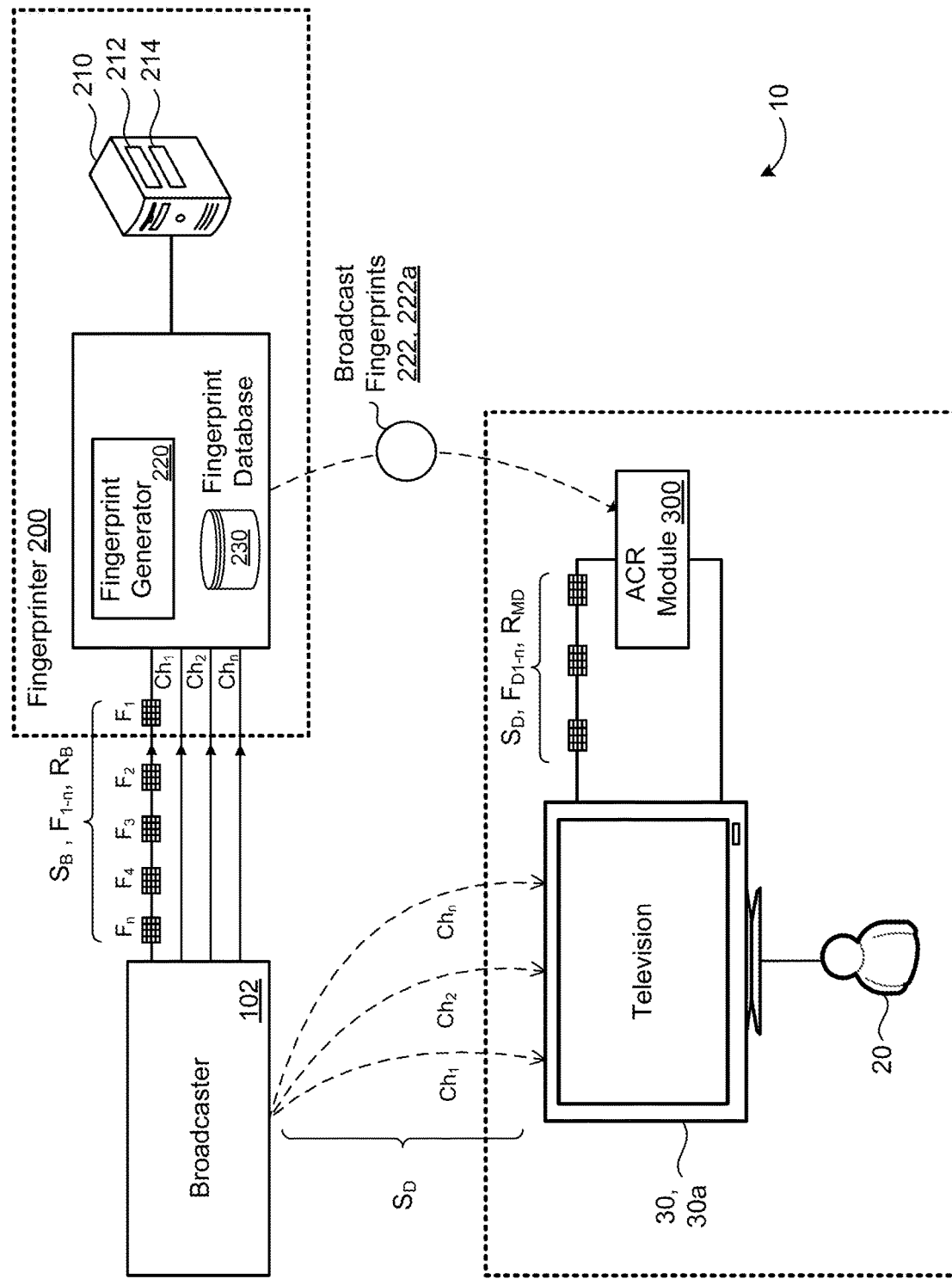
FIG. 1B is a schematic view of an example of an automatic content recognition environment.

Generally, automatic content recognition (ACR) is the process of identifying media content on a media device or within a media file. ACR has become increasingly useful to identify vast amounts of media content consumed by society every day. From a commercial perspective, ACR may allow businesses and other entities to understand media content consumption and, perhaps more effectively, to market or to target consumers (i.e. media device users) of the media content. For example, an advertisement or an offer is likely more effective when the advertisement is personalized to the user of a media device. Accordingly, broadcasters, commercial providers, advertisers and other entities want to know what programs are being viewed or, more particularly, where the user is in the program during viewing. With this type of information, the media device user may receive more precisely catered media content.

FIG. 1A is an example of an automatic content recognition environment 10. The automatic content recognition environment 10 may include several layers to distribute media content to a user 20 (i.e., a viewer) of a media device 30. FIG. 1A attempts to simplify the media content distribution process into four layers: a broadcast layer 100; an additional content layer 110; a network layer 120; and a device layer 130. Each layer 100, 110, 120, 130 may have entities that influence a media stream S. The broadcast layer 100 represents broadcast entities that may be involved to produce a broadcast media stream $S_B$. These broadcast entities may include a broadcaster 102 and a broadcast distributor 104. The broadcaster 102 may be one or more media content providers such as local broadcasters, multichannel networks, or other media content owners. The broadcast distributor 104 is a broadcast entity that provides infrastructure or resources (e.g., signal wires, communication towers, communication antennas, servers, etc.) to distribute media content. The broadcaster 102 and the broadcast distributor 104 may be the same broadcast entity or a different broadcast entity depending on broadcasting variables, such as a type of media content being provided or a type of media device receiving the media content.

In some implementations, the broadcast media stream $S_B$ includes additional media content $S_C$ from content entities represented as the additional content layer 110. These content entities include commercial providers 112, advertisers 114, or other entities contributing additional media content $S_C$ to the broadcast media stream $S_B$. Generally, commercial providers 112 are content entities that procure and/or host additional media content $S_C$, while advertisers 114 are content entities that generate the additional media content $S_C$ with content, such as advertisements, offers, deals, discounts, benefits, or other promotions of goods and/or services. Additionally or alternatively, the commercial providers 112 and the advertisers 114 may be the same content entity. The additional content layer 110 may communicate the additional media content $S_C$ to the broadcast layer 100, the network layer 120, the device layer 130, or any combination thereof. Optionally, the additional content layer 110 may pair the additional media content $S_C$ with the broadcast media stream $S_B$ to form a combined broadcast media stream $S_B$, $S_C$ that includes the additional media content $S_C$.

Referring further to FIG. 1A, the network layer 120 is configured to receive the broadcast media stream $S_B$ and the additional media content $S_C$ from the broadcast layer 100 and/or the additional content layer 110. For example, if the network layer 120 receives the media stream S from the broadcast layer 100, the network layer 120 may receive the broadcast media stream $S_B$ with the additional media content $S_C$ or independent of the additional media content $S_C$. Similarly, if the network layer 120 receives the media stream S from the additional content layer 110, the network layer 120 may receive the broadcast media stream $S_B$ with the additional media content $S_C$ or independent of the additional media content $S_C$. In some implementations, the network layer 120 may pair the broadcast media stream $S_B$ from the broadcast layer 100 with the additional media content $S_C$ from the additional content layer 110 to generate a network media stream $S_N$ representing the broadcast media stream $S_B$ impregnated with the additional media content $S_C$.

The network layer 120 includes a fingerprinter 200. The fingerprinter 200 is configured to operate on a server 210 having data processing hardware 212 and memory hardware 214. The fingerprinter 200 includes a broadcast fingerprint generator 220. The network layer 120 may be configured to store fingerprints 222 and metadata 224 related to the fingerprints 222 in a fingerprint database 230 and/or a metadata database 240. Generally, a fingerprint 222 is at least one unique identifier corresponding to at least one frame $F_n$ of the media stream S. For example, the at least one unique identifier may be a value (e.g., pixel value), an alphanumeric representation, or a compressed version of the audio visual image. Additionally or alternatively, the network layer 120 is configured to store the broadcast media stream $S_B$, the additional media content $S_C$, or both.

FIG. 1A also illustrates that any layer (i.e., the broadcast layer 100, the additional content layer 110, or the network layer 120) may communicate with the device layer 130. At the device layer 130, media devices 30, such as televisions, PCs, laptops, tablets, or mobile phones, receive a media device stream $S_D$ (e.g., any combination of the broadcast media stream $S_B$, the additional content stream $S_C$, or the network media stream $S_N$) and may convey all or a portion of the corresponding media device stream $S_D$ (e.g., any combination of the broadcast media stream $S_B$, the additional content stream $S_C$, or the network media stream $S_N$) to a user 20. A device may mean any hardware or any software related to a media device 30 configured to receive or to communicate some form of media content. In some implementations, the media devices 30 may be configured to interpret or to interact with the corresponding media stream (e.g., any combination of the broadcast media stream $S_B$, the additional content stream $S_C$, or the network media stream $S_N$). For example, the media devices 30 identify the additional media content $S_C$ from the broadcast media stream 101a. The media devices 30 may replace or overlay the additional media content $S_C$ of the broadcast media stream 101a with replacement media content. The media devices 30 may filter the broadcast media stream $S_B$, $S_C$ for predefined content. Additionally or alternatively, the media devices 30 may be configured to communicate information or data related to the media stream (e.g., any combination of the broadcast media stream $S_B$, the additional content stream $S_C$, or the network media stream $S_N$) with the broadcast layer 100, the additional content layer 110, the network layer 120, or other media devices 30 of the device layer 130.

FIG. 1B is an example of an automatic content recognition environment 10. The automatic content recognition environment 10 includes a broadcaster 102, a fingerprinter 200, and an automatic content recognition module (ACR module) 300. The broadcaster 102 broadcasts the broadcast media stream $S_B$, $S_C$ by channels $Ch_{1-n}$ to the fingerprinter 200 at a broadcast frame rate $R_B$. The broadcast frame rate $R_B$ divides the broadcast media stream $S_B$, $S_C$ into broadcast frames $F_{1-n}$ such that each broadcast frame $F_{1-n}$ corresponds to an audio visual image represented by pixels within the broadcast media stream $S_B$ (101a). The fingerprinter 200 is configured to receive each broadcast frame $F_{1-n}$ at the broadcast fingerprint generator 220. The broadcast fingerprint generator 220 receives each broadcast frame $F_{1-n}$ and is configured to generate broadcast fingerprints 222, 222a indicative of each broadcast frame $F_{1-n}$. Generally, a broadcast fingerprint 222, 222a is at least one unique identifier corresponding to at least one broadcast frame $F_{1-n}$. The fingerprinter 200 may store each broadcast fingerprint 222, 222a in a database, such as the fingerprint database 230. In some examples, the fingerprinter 200 stores each broadcast fingerprint 222, 222a according to or along with metadata 224 corresponding to the broadcast frame $F_{1-n}$ such as a frame location (e.g., a frame time code), a type of frame (e.g., live program or advertisement), or a fingerprint identifier tag. In other examples, the fingerprinter 200 has a separate database or databases corresponding to the metadata 224 of each broadcast fingerprints 222, 222a. A separate database for metadata 224 may allow the fingerprinter 200 to store more broadcast fingerprints 222, 222a.

Referring further to FIG. 1B, the broadcaster 102 also broadcasts the broadcast media stream $S_B$, $S_C$ to the media device 30. The media device 30 receives the broadcast media stream $S_B$, $S_C$ from the broadcaster 102 as a media device stream $S_D$, 101b. The media device 30 is configured to capture media frames $F_{D1-n}$ from the media device stream $S_B$, 101b and to communicate the captured media frames $F_{D1-n}$ to the ACR module 300. In the example shown in FIG. 1B, the media device 30 is a television 30, 30a (TV) that receives the media device stream $S_D$. For example, the television 30, 30a receives television channels $Ch_{1-n}$ as the media device stream $S_D$.

In some implementations, the broadcaster 102 provides the broadcast media stream $S_B$, $S_C$ at the broadcast frame rate $R_B$. The media device 30 (e.g., depicted as the TV 30, 30a) may receive the broadcast media stream $S_B$, $S_C$ at the corresponding broadcast frame rate $R_B$ as the media device stream $S_D$. Often, the broadcast frame rate $R_B$ corresponds to various industry standards of a broadcast format (e.g., 1080 60i, 720 60P, etc.). For example, some common broadcast frame rates $R_B$ include 30P (29.97 frames per second), 24P, (23.98 frames per second), and 60P (59.94 frames per second). The media device 30 may be configured to capture frames $F_{D1-n}$ of the media device stream $S_D$ at a media device frame rate $R_{MD}$. The media device frame rate $R_{MD}$ is the frame rate that a corresponding media device 30 provides captured frames $F_{D1-n}$ to the ACR module 300. In some implementations, the media device 30 may be configured to receive the media device stream $S_D$ at the broadcast frame rate $R_B$, but yet be configured to capture frames $F_{D1-n}$ of the media device stream $S_D$ at a media device frame rate $R_{MD}$ for the ACR module 300. For example, the broadcast frame rate $R_B$ is different than the media device frame rate R. An example of this difference is that the broadcast frame rate $R_B$ is greater than the media device frame rate $R_{MD}$ (e.g., a broadcast frame rate of 30P and a media device frame rate $R_{MD}$ of 4 frames per second). The difference in frame rates may be resource limitations (CPU, memory, etc.) relating to frame capturing hardware or software at the media device 30.

In some examples, the ACR module 300 receives broadcast fingerprints 222, 222a from the fingerprinter 200 and the media device frames $F_{D1-n}$ from the media device stream $S_D$. The ACR module 300 may compare the media device frames $F_{D1-n}$ to the broadcast frames $F_{1-n}$ to identify matching frames $F_n$, $F_{Dn}$. The ACR module 300 may be an internal device to the television 30, 30a (e.g., hardware or software of the television 30, 30a) or an external device in communication with the television 30, 30a (e.g., a headend system or a set top box).

Figure 2:
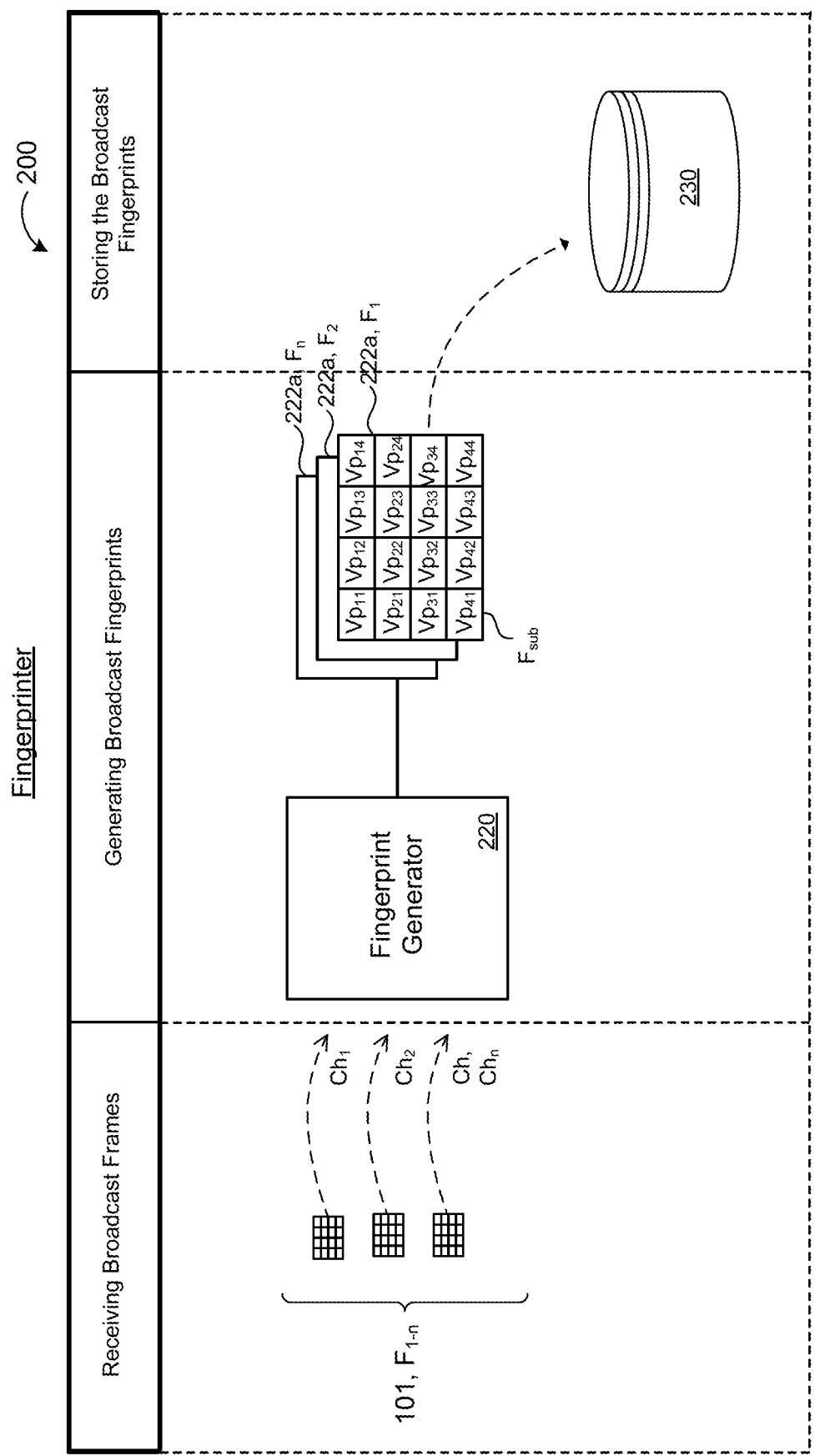
FIG. 2 is a schematic view of an example server of the automatic content recognition environment.

FIG. 2 is an example of the broadcast fingerprint generator 220 of the fingerprinter 200. The broadcast fingerprint generator 220 receives the broadcast frames $F_{1-n}$ corresponding to channels $Ch_{1-n}$ of the broadcast media stream $S_B$, $S_C$. The broadcast fingerprint generator 220 may generate a broadcast fingerprint 222, 222a for each received broadcast frame $F_{1-n}$ and may store the broadcast fingerprint 222, 222a in the fingerprint database 230. In some examples, each broadcast fingerprint 222, 222a represents at least one pixel value $V_P$ of the broadcast frame $F_{1-n}$ of the corresponding broadcast media stream $S_B$ (101a). The at least one pixel value $V_P$ may be an average pixel value or a sum of color space values of the broadcast frame $F_{1-n}$. For example, the at least one pixel value $V_P$ may represent a sum and/or average of grayscale values of a corresponding broadcast frame $F_{1-n}$ when the broadcast fingerprint generator 220 generates a broadcast fingerprint 222, 222a according to a gray-UV (YUV) color space. In other words, each pixel of the corresponding broadcast frame $F_{1-n}$ is represented by a grayscale value such that the broadcast fingerprint 222, 222a represents the sum and/or average of the grayscale values of a pixel area. In some implementations, the fingerprint 222 (e.g., the broadcast fingerprint 222, 222a) is a unique identifier based on sub-frames $F_{sub}$ of the corresponding broadcast frame $F_{1-n}$. Depending on the pixels per sub-frame $F_{sub}$, each sub-frame $F_{sub}$ may have a corresponding pixel value $V_P$ or a corresponding average pixel value.

FIG. 2 also illustrates an example of a broadcast fingerprint 222a, $F_{1-n}$ corresponding to a broadcast frame $F_{1-n}$ divided into sub-frames $F_{sub}$. In some examples, the broadcast fingerprint generator 220 may divide each broadcast frame $F_{1-n}$ into sub-frames $F_{sub}$ to more accurately compare or to distinguish between broadcast frames $F_{1-n}$. With sub-frames $F_{sub}$, each fingerprint 222 may represent more than one average pixel value $V_P$ of the corresponding frame $F_{1-n}$. By dividing each broadcast frame $F_{1-n}$ into sub-frames $F_{sub}$, more details (e.g., pixels of each sub-frame $F_{sub}$) are taken into account during broadcast fingerprint generation than broadcast fingerprints 222, 222a based on a pixel value $V_P$ (or average pixel value) of an entire broadcast frame $F_{1-n}$. As such, the number of sub-frames $F_{sub}$ that the broadcast fingerprint generator 220 divides each broadcast frame $F_{1-n}$ into depends on a desired level of accuracy. For example, as shown in FIG. 2, the broadcast fingerprint generator 220 divides each broadcast frame $F_{1-n}$ into sixteen sub-frames $F_{sub}$ defining a four by four array. Each sub-frame $F_{sub}$ of the sixteen sub-frames $F_{sub}$ has an average pixel value $V_{p11-44}$ such that each broadcast fingerprint 222a represents each corresponding broadcast frame $F_{1-n}$ by a sixteen value integer vector having an integer value associated with each sub-frame $F_{sub}$. Although the figures may depict each broadcast frame $F_{1-n}$ or each media device frame $F_{D1-n}$ as a four by four array, any sub-frame division is possible.

FIG. 3A-3G are examples of the ACR module 300. The ACR module 300 is configured to determine a frame match 310 between the media device frames $F_{D1-n}$ of a media device stream $S_D$ relative to the broadcast frames $F_{1-n}$ of a broadcast media stream $S_B$, $S_C$. In some examples, the ACR module 300 includes a fingerprint generator 320 and a synchronizer 330. The fingerprint generator 320 functions similar to the broadcast fingerprint generator 220, except that the fingerprint generator 320 of the ACR module 300 generates fingerprints 222 (i.e. media device fingerprints 222, 222b) corresponding to media device frames $F_{D1-n}$ captured at a media device 30 (e.g., the TV 30, 30a). The fingerprint generator 320 is configured to communicate the media device fingerprints 222, 222b to the synchronizer 330.

In some implementations, the synchronizer 330 receives the media device fingerprints 222, 222b and the broadcast fingerprints 222, 222a from the fingerprinter 200. With the media device fingerprints 222, 222b and the broadcast fingerprints 222, 222a, the synchronizer 330 identifies the frame match 310. The frame match 310 is a broadcast frame $F_{1-n}$ that matches a given media device frame $F_{D1-n}$. Additionally or alternatively, the broadcast frame $F_{1-n}$ that corresponds to the frame match 310 is also referred to as a matching broadcast frame $F_{MB}$ while the media device frame $F_{D1-n}$ corresponding to the frame match 310 is referred to as the matched media device frame $F_{MD}$. The ACR module 300 may identify parameters of the media content at the media device stream $S_D$ based on the matching broadcast frame F. For example, with the frame match 310, the ACR module 300 may identify metadata 224 from the matching broadcast frame F. The metadata 224 may include a frame location (e.g., frame time code), a type of frame (e.g., live program or advertisement), a channel corresponding to the matching broadcast frame $F_{MB}$, an identifier tag, or any descriptor related to the matching broadcast frame F. The ACR module 300 may associate the metadata 224 from the matching broadcast frame $F_{MB}$ with the matched media device frame $F_{MD}$ of the frame match 310. In some examples, the ACR module 300 associates metadata 224 regarding a channel Ch corresponding to the media device frame $F_{D1-n}$ and/or a frame location within the channel Ch (e.g., a frame time code).

With knowledge of the channel Ch and the position of the media device stream $S_D$ at the media device 30, broadcasters 102 and additional content providers may know what program a user 20 is watching and contemporarily where the user 20 is in the sequence of the program. The broadcaster 102 and the additional content provider may then use such information to accurately target the user 20 for advertisements and offers or provide non-commercial information to the user 20 (e.g., news alerts, announcements, educational information, etc.). Thus, the ACR module 300 may allow an entity to coordinate media content provided to the user 20 during use of a media device 30. Yet a potential problem with the frame match process at the ACR module 300 is that consecutive media device frames $F_{D1-n}$ may be very similar, such that consecutive media device frames $F_{D1-n}$ only have slight changes over time unless a scene change occurs drastically changing consecutive media device frames $F_{D1-n}$. Due to only slight changes typically between consecutive media device frames $F_{D1-n}$, the ACR module 300 may be at risk of falsely identifying a frame match 310. In other words, when the ACR module 300 determines that the media device stream $S_D$ is being viewed by the user 20 at one media device frame $F_{D1-n}$ (a matched media device frame $F_{D1-n}$), the user 20 is actually viewing media content from the media device stream $S_D$ a few media device frames $F_{D1-n}$ ahead of or behind the matched media device frame F.

In some situations, the frame matching by the ACR module 300 may have even greater matching error (i.e. risk of falsely identifying a frame match 310) when there is a difference in frame rates between the broadcast (i.e. the broadcast frame rate $R_B$) and the media device (i.e. the media device frame rate $R_{MD}$). For example, if the media device frame rate $R_{MD}$ is much slower than the broadcast frame rate $R_B$, the matched media device frame $F_{MD}$ may be further in time from the currently viewed media device frame $F_{D1-n}$ by the user 20; causing a timing mismatch. In some examples, the timing mismatch is large enough that additional content providers performing dynamic advertising replacement (DAR) based on the ACR module 300 replace live programming instead of advertisements.

To address the potential of a matching error, the ACR module 300 is configured to determine a frame certainty metric 340 as an indicator of whether the frame match 310 corresponds to a media device frame $F_{D1-n}$, that best matches the matching broadcast frame F. In other words, the ACR module 300 may determine, by the frame certainty metric 340 that the frame match 310 should shift to a different media device frame $F_{D1-n}$, than the original match media device frame $F_{MD}$. The ACR module 300 may be programmed to shift the frame match 310 when a media device frame $F_{D1-n}$ sequentially adjacent to the match media device frame $F_{MD}$ has a greater frame certainty metric 340.

Figure 3A:
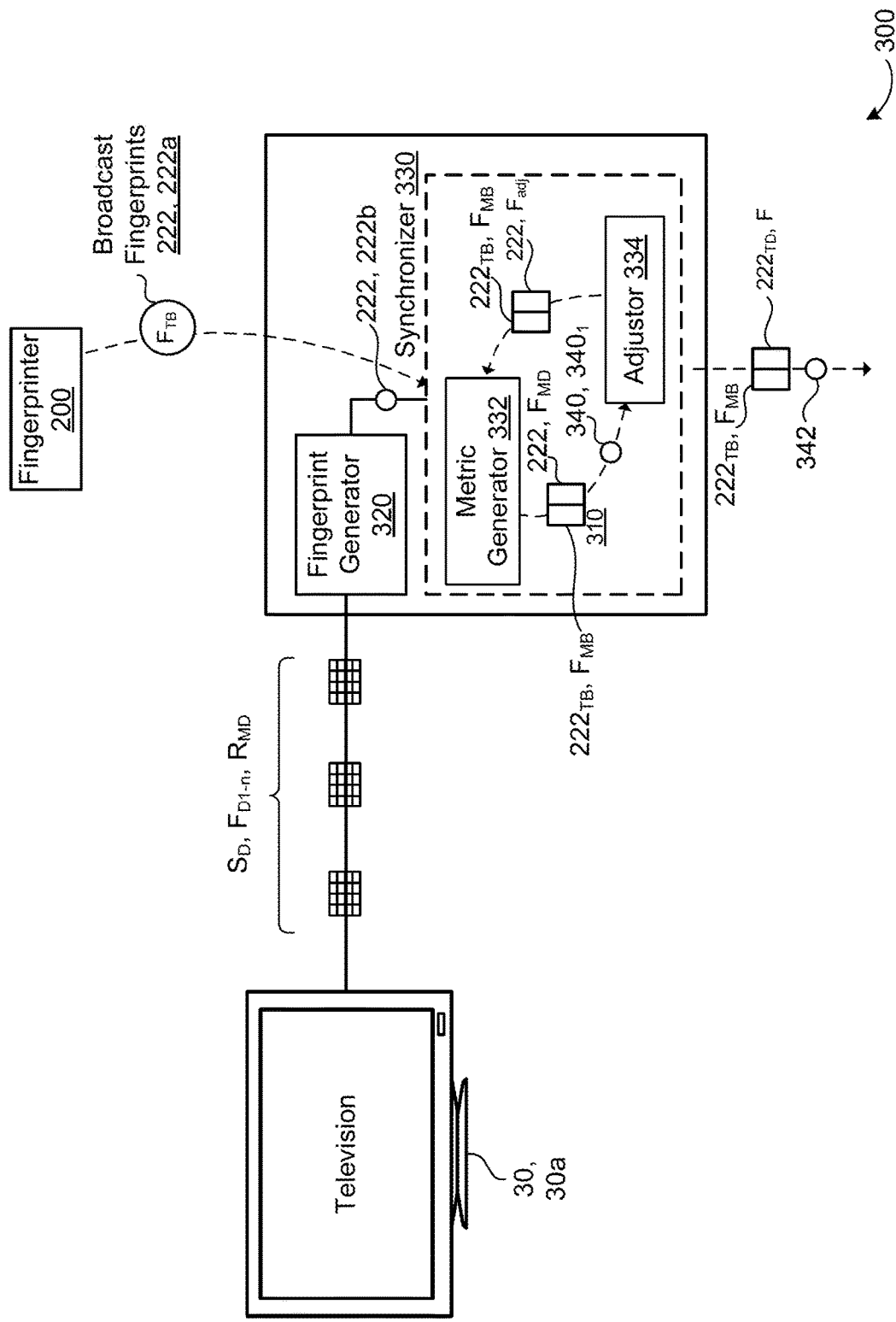
FIG. 3A is a schematic view of an example automatic content recognition module corresponding to a media device.
Figure 3B:
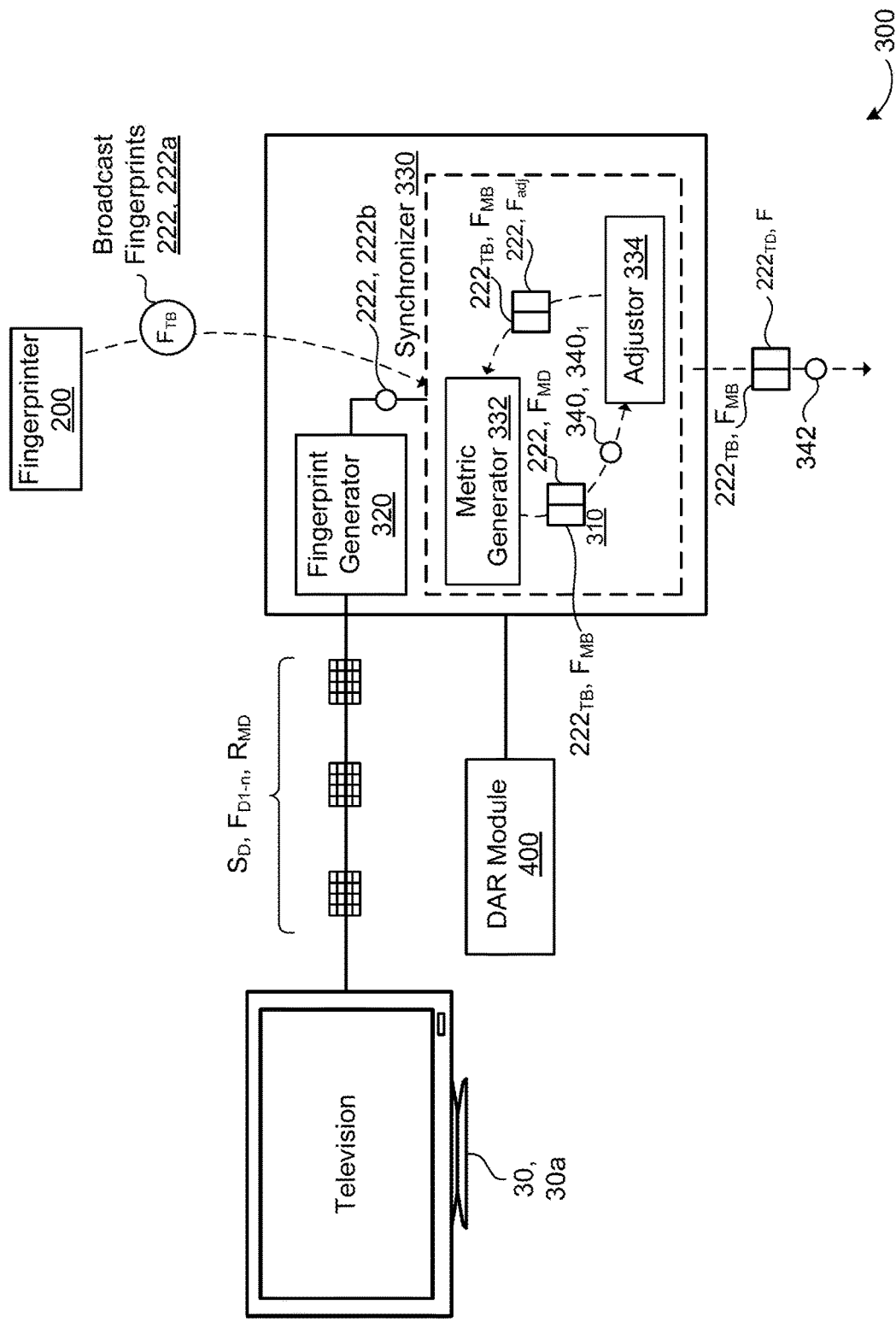
FIG. 3B is a schematic view of an example automatic content recognition module corresponding to a media device.
Figure 3C:
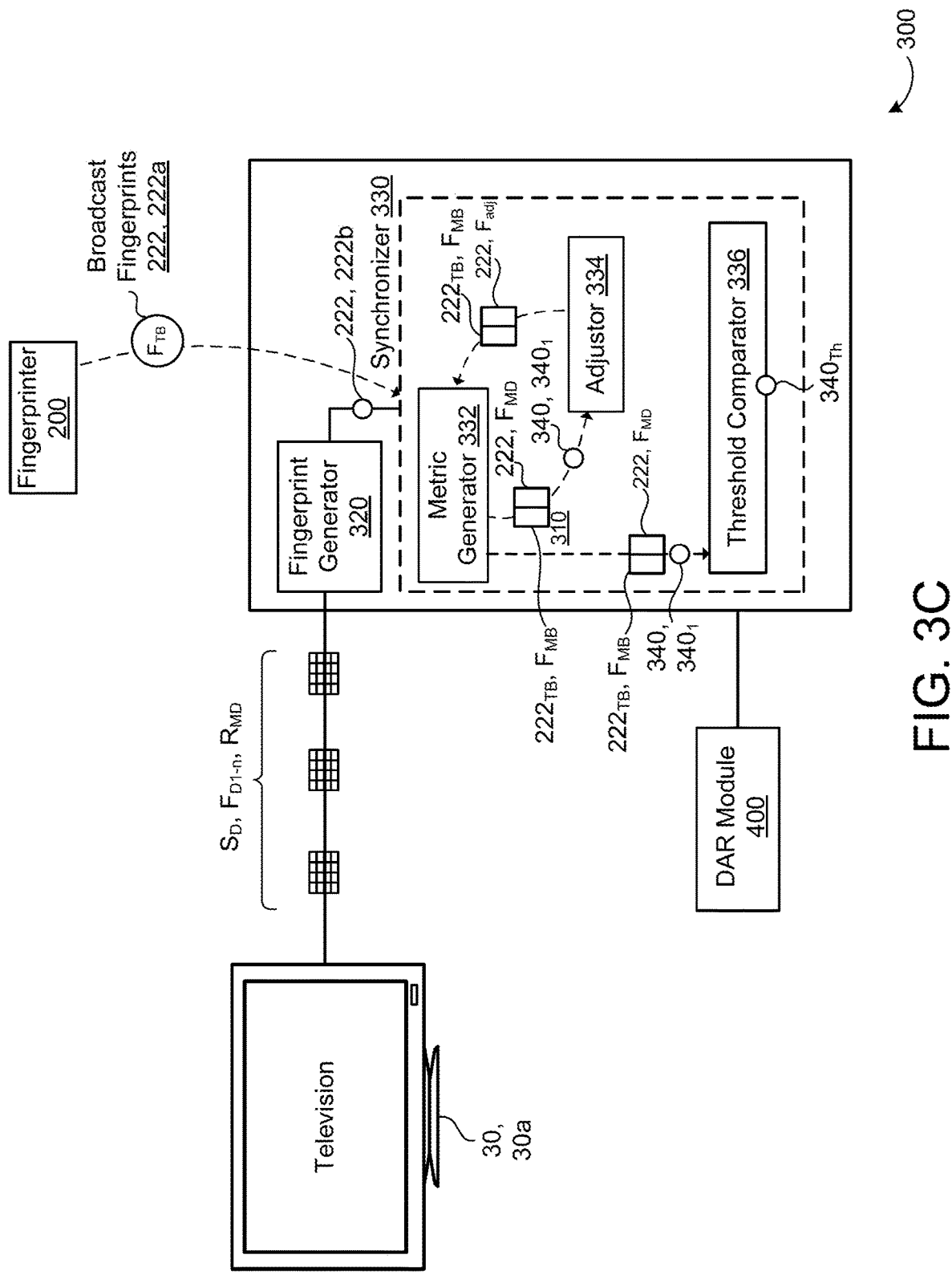
FIG. 3C is a schematic view of an example automatic content recognition module corresponding to a media device.

As shown in example FIGS. 3A-3G, the synchronizer 330 of the ACR module 300 includes a metric generator 332 and an adjustor 334. The metric generator 332 generates the frame certainty metric 340, $340_{i-n}$ based on a comparison between frames F. The frame certainty metric 340 is a measurement of similarity indicating a strength of a match between frames F and/or fingerprints 222 corresponding to frames F. The measurement of similarity indicating the strength of a match may be a quantitative correlation such as a statistical correlation that measures associations between two variables (e.g., a Pearson correlation, a Kendall correlation, or a Spearman correlation). In some implementations, the frame certainty metric 340 has more than one certainty level where each certainty level indicates a different strength of the match between frames F and/or fingerprints 222 corresponding to frames F. As basic examples, the frame certainty metric 340 may have two or three certainty levels (e.g., low and high or low, medium, and high) corresponding to discrete quantitative measurement ranges (e.g., low=0-0.33, medium=0.34-0.66, and high=0.067-1.0) In some examples, the metric generator 332 determines the frame certainty metric 340 according to a media device fingerprint 222, 222b and a broadcast fingerprint 222, 222a. In these examples, the broadcast fingerprint 222, 222a is a target broadcast fingerprint 222, $222_{TB}$ corresponding to the matching broadcast frame F. As shown in FIGS. 3A-3C, the fingerprinter 200 may provide the broadcast fingerprints 222, 222a, including the target broadcast fingerprint 222, $222_{TB}$, to the ACR module 300. In other examples, the ACR module 300 may query or communicate with the fingerprinter 200 to acquire the target broadcast fingerprint 222, $222_{TB}$.

In some implementations, the metric generator 332 generates iterations of frame certainty metrics 340, $340_{i-n}$ to determine a greatest frame certainty metric 342 for the ACR module 300. Each iteration may correspond to a media device frame $F_{D1-n}$ sequentially adjacent to the match media device frame $F_{MD}$ provided by the adjustor 334. Additionally or alternatively, each iteration may correspond to three different frame certainty metrics 340, $340_{(1-3)}$ corresponding to the match media device frame $F_{MD}$ and each frame $F_{ad}$) sequentially adjacent to the match media device frame $F_{MD}$. The adjustor 334 is configured to receive a frame F (e.g., media device frame $F_{D1-n}$ or media device frame $F_{D1-n}$) and/or fingerprint 222 corresponding to a frame F and to return a sequentially adjacent frame $F_{adj}$ to the received frame F and/or a sequentially adjacent fingerprint 222, $F_{adj}$ corresponding to the sequentially adjacent frame $F_{adj}$.

FIGS. 3A-3C are examples of a first iteration of the metric generator 332. In these examples, the metric generator 332 determines a first frame certainty metric 340, $340_1$ based on fingerprints 222 relating to the frame match 310. In other words, the metric generator 332 determines a first frame certainty metric 340, $340_1$ based on a first media device fingerprint 222, $F_{MD}$ (e.g., a media device fingerprint 222, 222b corresponding to the match media device frame $F_{MD}$) and the target broadcast fingerprint 222, $222_{TB}$. The adjustor 334 receives the first media device fingerprint 222, $F_{MD}$ and/or the target broadcast fingerprint 222, $222_{TB}$ and returns to the metric generator 332 a second media device fingerprint 222, $F_{adj}$ sequentially adjacent to the first media device fingerprint 222, $F_{MD}$ along with the target broadcast fingerprint 222, $222_{TB}$. Additionally or alternatively, the metric generator 332 may be configured to store the target broadcast fingerprint 222, $222_{TB}$ such that the adjustor 334 only returns the second media device fingerprint 222, $F_{adj}$ sequentially adjacent to the first media device fingerprint 222, F. For example, if the metric generator 332 stores the target broadcast fingerprint 222, $222_{TB}$ based on the frame match 310, the metric generator 332 may not communicate the target broadcast fingerprint 222, $222_{TB}$ to the adjustor 334.

The ACR module 300 may repeat multiple iterations of the frame certainty metric process between the metric generator 332 and the adjustor 334. The ACR module 300 may perform the multiple iterations to determine the greatest frame certainty metric 342 amongst each frame certainty metric 340, $340_i$ of each iteration. With the greatest frame certainty metric 342, the ACR module 300 identifies the media device fingerprint 222, 222b corresponding to the greatest frame certainty metric 342 as a target media device fingerprint 222, $222_{TD}$ matching the target broadcast fingerprint 222, $222_{TB}$.

In some examples, the ACR module 300 may perform operations based on the frame certainty metric 340. FIG. 3B is an example of an ACR module 300 similar to the ACR module 300 of FIG. 3A except that the ACR module 300 additionally communicates with a dynamic advertising replacement (DAR) module 400. Generally, the DAR module 400 is a system that may identify media device frames $F_{D1-n}$ representing advertisements within the media device stream $S_D$ and may replace (or overlay) the advertisements with replacement advertisements. The DAR module 400 may use information communicated from the ACR module 300 to identify a frame location of advertisements within the media device stream $S_D$ relative to the frame location of the media device frame $F_{D1-n}$ corresponding to the target media device fingerprint 222, $222_{TD}$. For example, as the ACR module 300 identifies the target media device fingerprint 222, $222_{TD}$ matching the target broadcast fingerprint 222, $222_{TB}$, the ACR module 300 communicates the target media device fingerprint 222, $222_{TD}$ or the media device frame $F_{D1-n}$ corresponding to the target media device fingerprint 222, $222_m$ to the DAR module 400. In some examples, the ACR module 300 communicates metadata 224 (e.g., a frame location) associated with the media device frame $F_{D1-n}$ corresponding to the target media device fingerprint 222, $222_{TD}$ such that the DAR module 400 may align a set of replacement frames $F_{RP(1-n)}$ with media device frames $F_{D1-n}$ to be replaced.

FIG. 3C is also an example of an ACR module 300 similar to that of FIGS. 3B and 3C except that the ACR module 300 includes a threshold comparator 336. The threshold comparator 336 may be configured to minimize iterations of frame certainty metrics 340 performed by the ACR module 300. By minimizing the iterations, the ACR module 300 may process more quickly and rely on less processing power. The threshold comparator 336 may be configured with a frame certainty metric threshold $340_{Th}$ to be compared to the frame certainty metric 340 after each iteration. With a frame certainty metric threshold $340_{Th}$, the ACR module 300 does not have to continue determining the frame certainty metric 340 until the ACR module 300 determines a best frame certainty metric 342. For example, if the frame certainty metric 340 is exceeds the frame certainty metric threshold $340_{Th}$, the synchronizer 330 discontinues the frame certainty metric generation and identifies the media device fingerprint 222, 222b corresponding to the frame certainty metric 340 exceeding the frame certainty metric threshold $340_{Th}$ as the target media device fingerprint 222, $222_{TD}$ matching the target broadcast fingerprint 222, $222_{TB}$. As shown in the example of FIG. 3C, the metric generator 332 generates the first iteration of the frame certainty metric 340, $340_1$ for the adjustor 334 and the threshold comparator 336 determines whether the first iteration of the frame certainty metric 340, $340_1$ satisfies the frame certainty metric threshold $340_{Th}$.

Optionally, if the frame certainty metric 340, $340_1$ satisfies the frame certainty metric threshold $340_{Th}$, the ACR module 300 may communicate with a DAR module 400 as discussed in further detail with FIG. 3B.

Figure 3D:
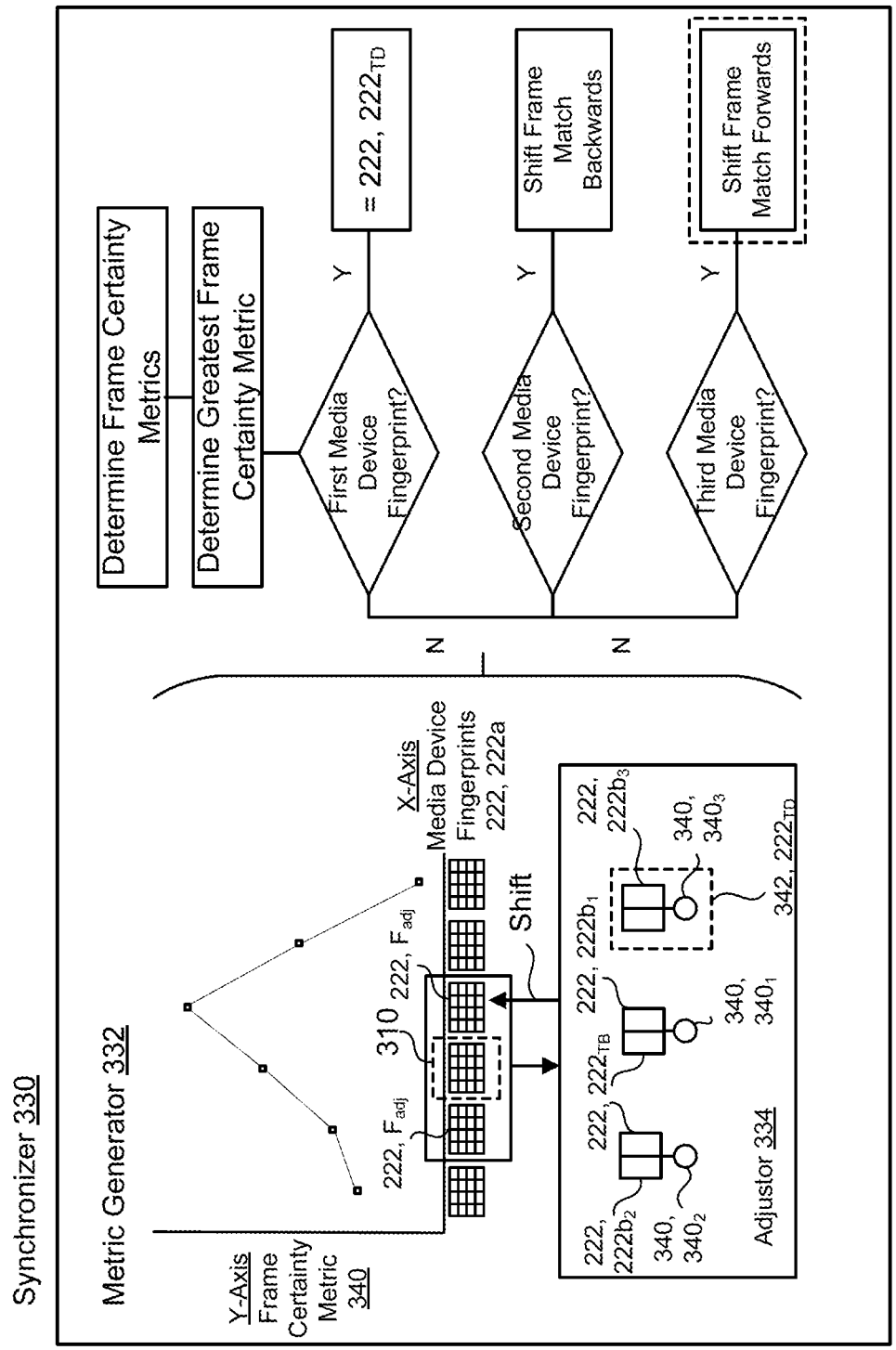
FIG. 3D is a schematic view of an example synchronizer of the automatic content recognition module corresponding to a media device.
Figure 3E:
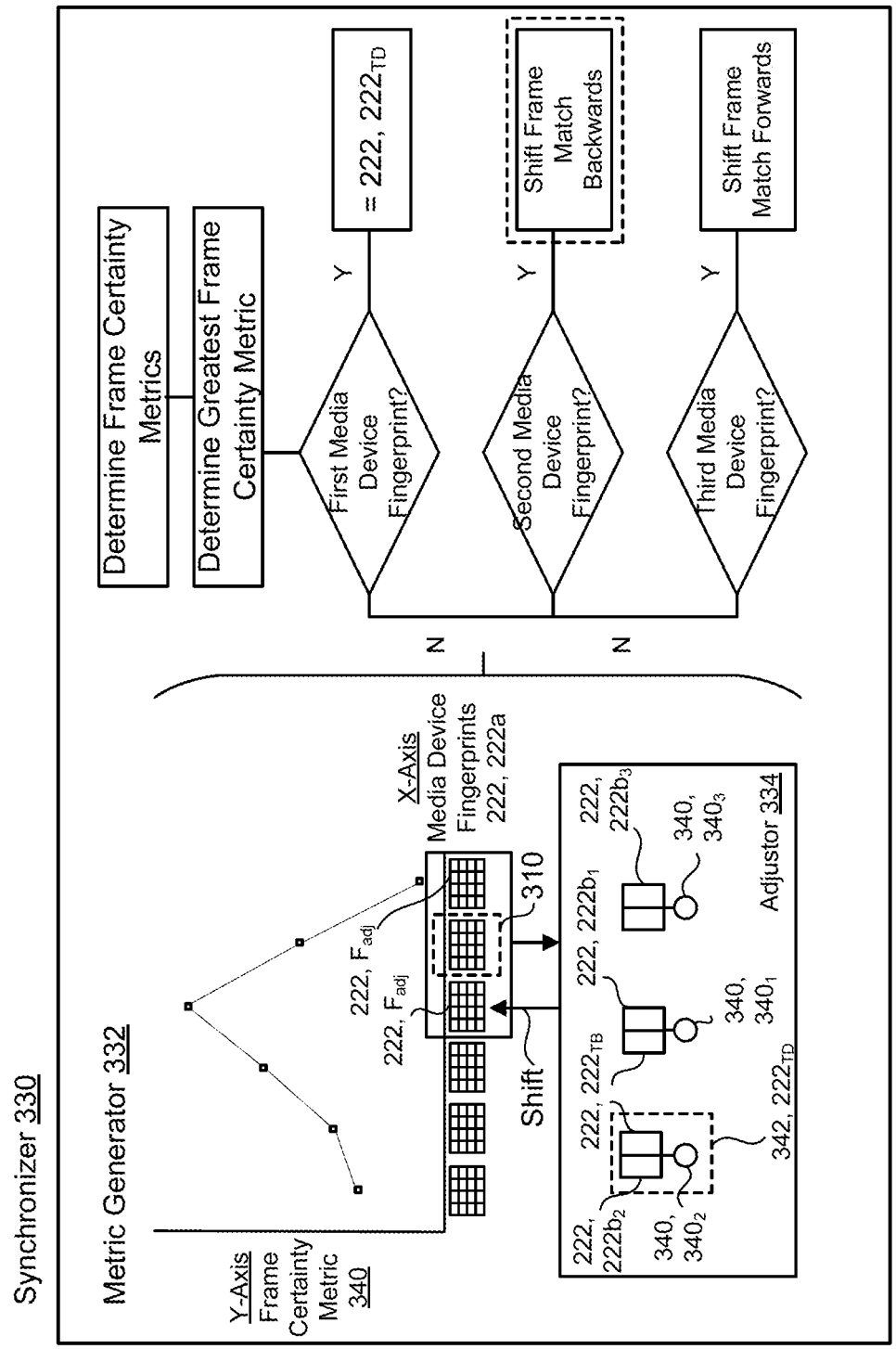
FIG. 3E is a schematic view of an example synchronizer of the automatic content recognition module corresponding to a media device.
Figure 3F:
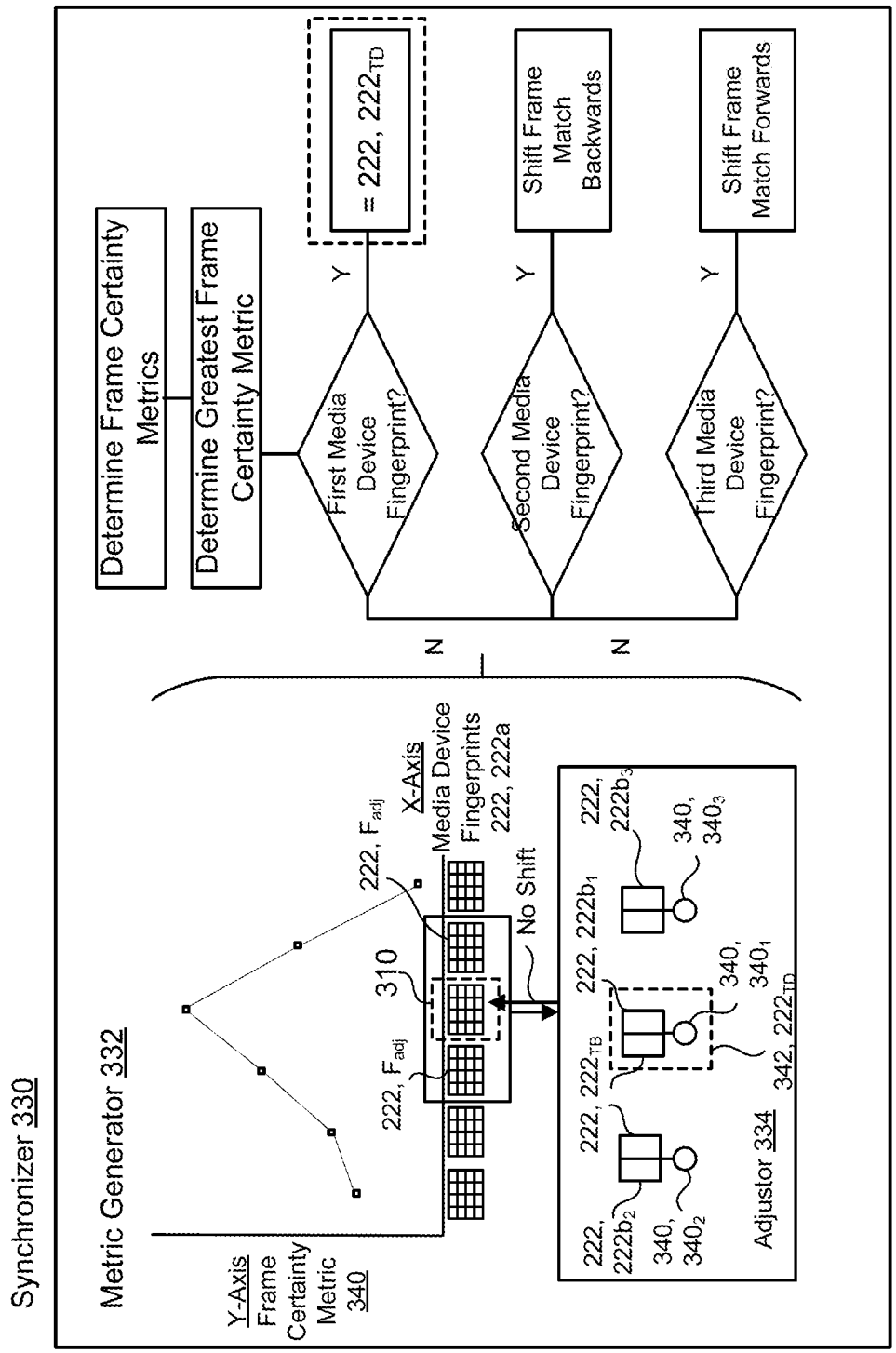
FIG. 3F is a schematic view of an example synchronizer of the automatic content recognition module corresponding to a media device.

FIGS. 3D-3G are alternative views of the synchronizer 330 when the ACR module 300 determines whether to shift the frame match 310. The metric generator 332 generates a frame certainty metric 340 between each media device fingerprint 222, 222b corresponding to a media device frame $F_{D1-n}$ and the target broadcast fingerprint 222, $222_{TB}$. FIGS. 3D-3G represent each frame certainty metric 340, $340_{(1-n)}$ corresponding to a media device frame $F_{D1-n}$ (e.g., via a media device fingerprint 222, 222b) as a point on a curve. In some examples, as illustrated by FIGS. 3D-3G, one iteration of the metric generator 332 communicates three frame certainty metrics 340, $340_{1-3}$ to the adjustor 334: the first frame certainty metric 340, $340_1$ based on a first media device fingerprint 222, $222b_1$ and the target broadcast fingerprint 222, $222_{TB}$. The second frame certainty metric 340, $340_2$ based on a second media device fingerprint 222, $222b_2$ and the target broadcast fingerprint 222, $222_{TB}$ such that the second media device fingerprint 222, $222b_2$ is sequentially adjacent the first media device fingerprint 222, $222b_1$ (e.g., before or after the first media device fingerprint in time); and the third frame certainty metric 340, $340_3$ based on a third media device fingerprint 222, $222b_3$ and the target broadcast fingerprint 222, $222_{TB}$ such that the third media device fingerprint 222, $222b_3$ is sequentially adjacent the first media device fingerprint 222, $222b_1$ yet opposite the second media device fingerprint 222, $222b_2$. The adjustor 334 may select the greatest frame certainty metric 342 from these three frame certainty metrics 340, $340_{1-3}$ and may assign the media device fingerprint 222, 222b with the greatest frame certainty metric 342 as the first media device fingerprint 222, $222b_1$ (or target media device fingerprint) for the next iteration. For example, FIG. 3D depicts the three media device fingerprints 222, $222b_{1-3}$ with a solid lined selection box and designates the first media device fingerprint 222, $222b_1$ as centered among the three with a dashed selection box. The three selected media device fingerprints 222, $222b_{1-3}$ pair with corresponding frame certainty metrics 340, $340_{1-3}$ and the adjustor 334 selects the third media device fingerprint 222, $222b_3$ with the greatest frame certainty metric 342. Based on this selection, the ACR module 300 determines to shift the frame match 310 forward. FIG. 3E illustrates a shift of the frame match 310 in an opposite direction. More particularly, the media device fingerprint 222, 222b with the greatest frame certainty metric 342 is the second media device fingerprint 222, $222b_2$ corresponding to a backwards shift because the second media device fingerprint 222, $222b_2$ correspond to a frame previous in time than the first media device fingerprint. FIG. 3F illustrates a third potential scenario where the media device fingerprint 222, 222b corresponding to the match media device frame of the frame match 310 has the greatest frame certainty metric 342. In this example, the ACR module 300 does not need to shift the frame match 310, but rather identifies the media device fingerprint 222, $222b_1$ as the target media device fingerprint $222, 222_{TD}$ that matches the target broadcast fingerprint 222, $222_{TB}$.

Figure 3G:
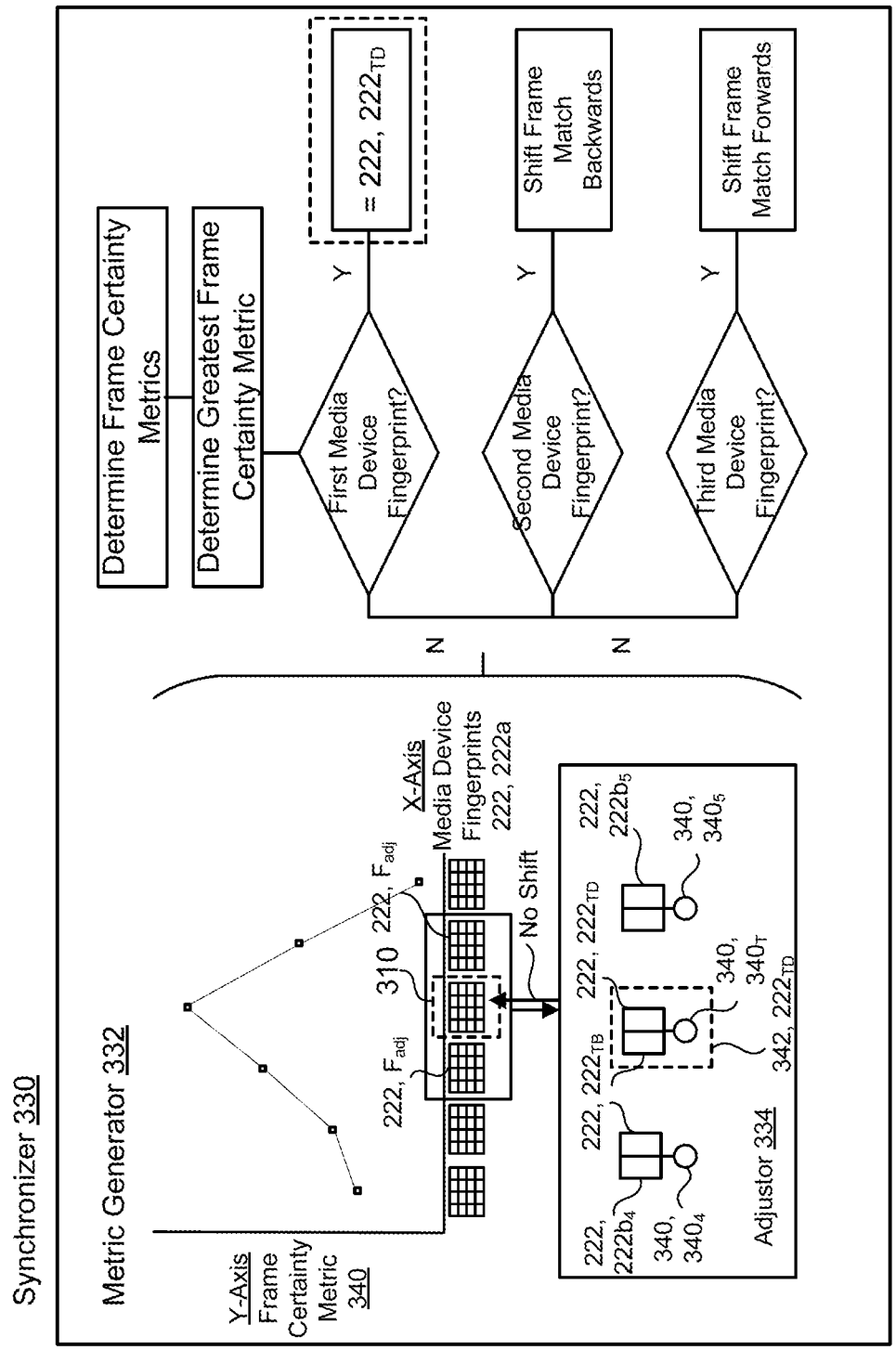
FIG. 3G is a schematic view of an example synchronizer of the automatic content recognition module corresponding to a media device.

Referring further to the ACR module 300, FIG. 3G provides an example of a second iteration between the metric generator 332 and the adjustor 334 as a progression from the first iteration of either FIG. 3D or 3E. In the second iteration, the metric generator 332 communicates with the adjustor 334 to determine whether another shift of the frame match 310 is necessary. During the second iteration, the ACR module 300 identifies the frame certainty metric 342 of the target media device fingerprint 222, $222_m$ of the first iteration as the target frame certainty metric 340, $340_T$. The metric generator 332 communicates the target frame certainty metric 340, $340_T$ along with two more frame certainty metrics 340, $340_{4-5}$ to the adjustor 334: a fourth frame certainty metric 340, $340_4$ based on a fourth media device fingerprint 222, $222b_4$ and the target broadcast fingerprint 222, $222_{TB}$ such that the fourth media device fingerprint 222, $222b_4$ is sequentially adjacent the target media device fingerprint 222, $222_{TD}$ and a fifth frame certainty metric 340, $340_5$ based on a fifth media device fingerprint 222, $222b_5$ and the target broadcast fingerprint 222, $222_{TB}$ such that the fifth media device fingerprint 222, $222b_5$ is sequentially adjacent the target media device fingerprint 222, $222_{TD}$ and opposite the fourth media device fingerprint 222, $222b_4$. The adjustor 334 may select the greatest frame certainty metric 342 from these three frame certainty metrics 340, $340_{4,5,TD}$ and may assign the media device fingerprint 222, $222b$ with the greatest frame certainty metric 342 as the target media device fingerprint 222, $222_m$. In the example of FIG. 3G, the target media device fingerprint 222, $222_{TD}$ of the first iteration again has the greatest frame certainty metric 342. Therefore, the ACR module 300 identifies the target media device fingerprint 222, $222_{TD}$ of the first iteration again as the target media device fingerprint 222, $222_{TD}$ matching the target broadcast fingerprint 222, $222_{TB}$. Although only two iterations have been depicted, a captured media device stream may take several iterations to identify the target media device fingerprint 222, $222_m$ that will properly synchronize the ACR module 300 with the media device stream $S_D$.

Figure 4:
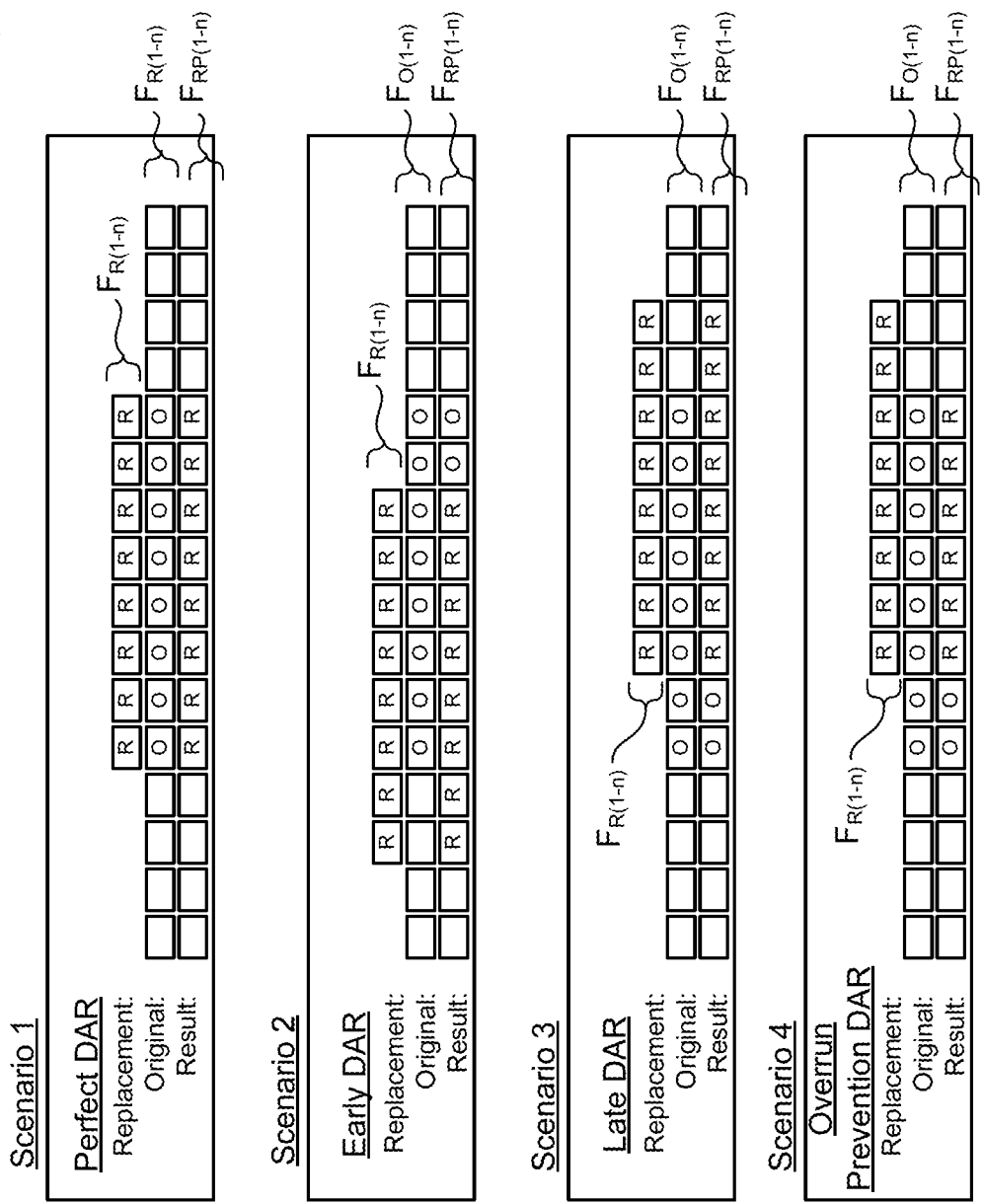
FIG. 4 is a schematic view of example scenarios of dynamic advertisement replacement.

FIG. 4 is an example of four scenarios to illustrate timing mismatch (also referred to as "slop") with respect to a dynamic advertisement replacement (DAR) module 400. The timing mismatch or slop, generally, refers to the number of incorrectly replaced media device frames $F_{D1-n}$ that are during replacement. For each scenario, FIG. 4 illustrates a set of replacement frames $F_{RP(1-n)}$ (shown as eight frames), a set of original frames $F_{O(1-n)}$, and a set of resultant frames $F_{R\ (1-n)}$. The set of original frames $F_{O(1-n)}$ corresponds to frames targeted by the DAR module 400 for dynamic advertisement replacement. The targeted frames may represent preexisting advertisements in a media device stream that an additional content provider wants to replace. Scenario 1 illustrates ideal or perfect dynamic advertisement replacement. In this scenario, the set of replacement frames $F_{RP(1-n)}$ aligns with the set of original frames $F_{O(1-n)}$ such the set of resultant frames $F_{R(1-n)}$ includes only frames from the set of replacement frames $F_{RP(1-n)}$ and not any frames from the set of original frames $F_{O(1-n)}$. In the perfect dynamic advertisement replacement, the replacement should look nearly seamless to the user 20. The set of replacement frames $F_{RP(1-n)}$ does not cut into the media device stream $S_D$ too early (e.g., potentially cutting off live programming) or too late (e.g., potentially viewing two different advertisements). When the DAR module 400 misaligns the set of replacement frames $F_{RP(1-n)}$ with the set of original frames $F_{O(1-n)}$, the misalignment may result in early or late DAR. Scenario two represents early DAR. Early DAR may compromise media content viewing quality because the set of replacement frames $F_{RP(1-n)}$ can cutoff live programming by splicing into the media device stream $S_D$ too early before the targeted frames. For example, the user 20 views his or her live programming suddenly cut to an advertisement, complete the advertisement, and then transition back to a tail end of another advertisement (i.e., a portion of the targeted frames). Scenario two represents early DAR by illustrating that the set of resultant frames $F_{R(1-n)}$ contains two original frames from the set of original frames $F_{O(1-n)}$. The opposite effect may occur if the DAR module 400 replaces the targeted frames too late. For example, the user 20 begins to see an advertisement after a portion of live programming, then witnesses the media device stream $S_D$ cut to the replacement advertisement, and then returns to the live programming after the live programming has resumed. Scenario three represents late DAR by illustrating that the set of resultant frames $F_{R(1-n)}$ contains two frames from the set of replacement frames $F_{RP(1-n)}$. Scenario four represents overrun prevention by the DAR module 400. In some examples, the DAR module 400 is configured to mitigate some of these effects of DAR misalignment by overrun prevention. For example, as shown in FIG. 4, overrun prevention truncates a misaligned set of set of replacement frames $F_{RP(1-n)}$. Properly aligned DAR is important especially in situations of different frame rates because, generally, an acceptable level of slop is only three frames.

Although the examples of the ACR module 300 often depict the ACR module 300 at or interacting with the device layer 130, various functions or portions of functions of the ACR module 300 may be performed at any of the layers (e.g., broadcast layer 100, network layer 120, or device layer 130) within the automatic content recognition environment 10. For example, the synchronizer 330 could exist on the network layer 120 (e.g., the fingerprinter 200) communicating with the device layer 130. In other examples, portions of the synchronizer 330, such as the metric generator 332 or the adjustor 334, occur at the network layer 120. Still yet, functions by the DAR module 400 may occur at the broadcast layer 100 or the additional content layer 110 depending on a level of control sought by broadcasters 102, broadcast distributors 104, commercial providers 112, or advertisers 114.

Figure 5:
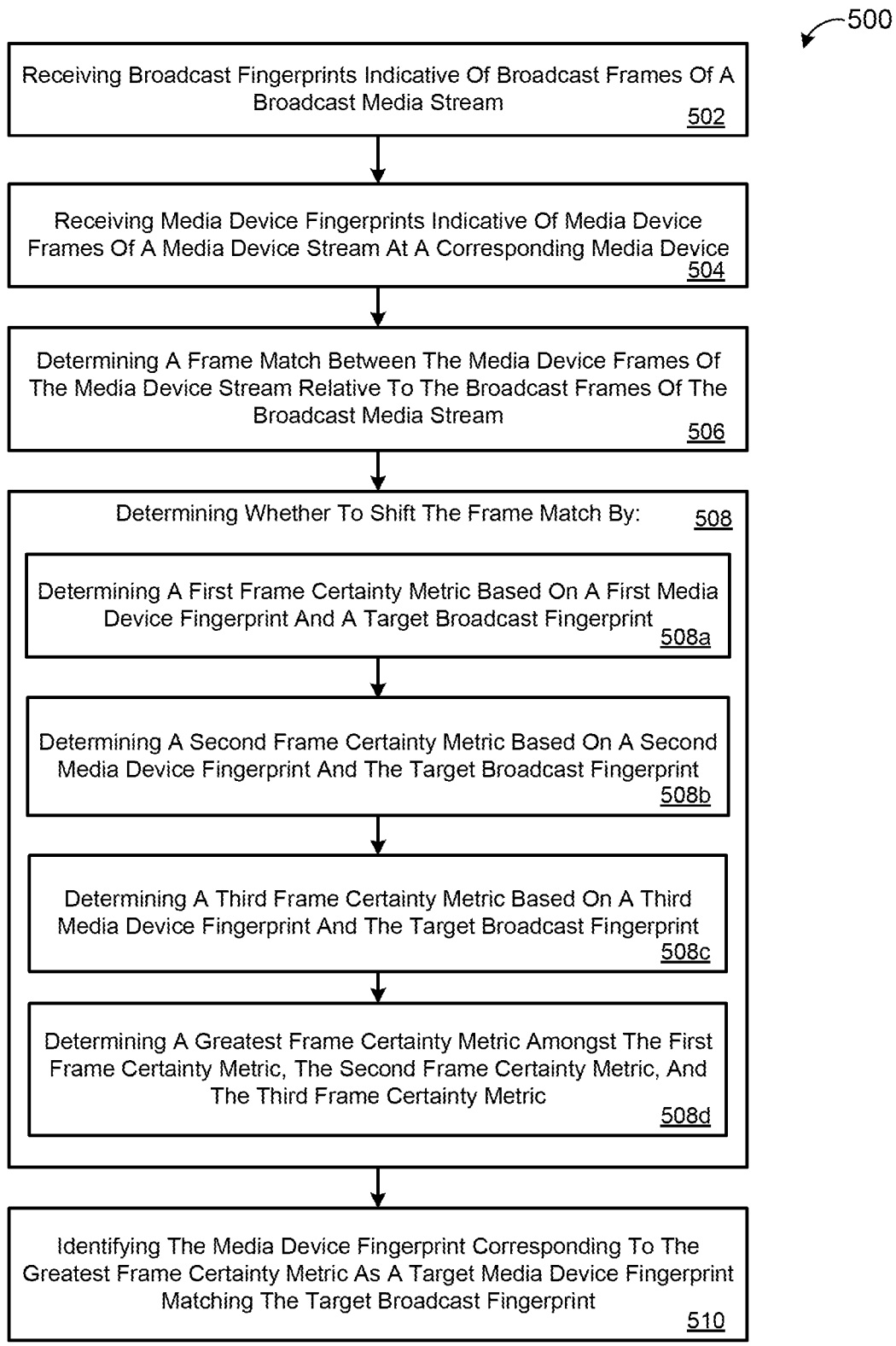
FIG. 5 is a flow diagram for an example automatic content recognition environment.

FIG. 5 illustrates a method 500 for a frame certainty metric for automatic content recognition. At block 502, the method 500 includes receiving broadcast fingerprints 222, 222a indicative of broadcast frames $F_{1-n}$ of the broadcast media stream $S_B$, $S_C$. At block 504, the method 500 includes receiving media device fingerprints 222, 222b indicative of media device frames $F_{D1-n}$ of the media device stream $S_D$ at the corresponding media device 30. At block 506, the method 500 includes determining the frame match 310 between the media device frames $F_{D1-n}$ of the media device stream $S_D$ relative to the broadcast frames $F_{1-n}$ of the broadcast media stream $S_B$, $S_C$. At block 508, the method 500 includes determining whether to shift the frame match 310 by: (a) determining the first frame certainty metric 340, $340_1$ based on a first media device fingerprint 222, $222b_1$ and a target broadcast fingerprint 222, $222_{TB}$; (b) determining the second frame certainty metric based 340, $340_2$ on a second media device fingerprint 222, $222b_2$ and the target broadcast fingerprint 222, $222_{TB}$; (c) determining the third fame certainty 340, $340_3$ metric based on a third media device fingerprint 222, $222b_3$ and the target broadcast fingerprint 222, $222_{TB}$; and (d) determining the greatest frame certainty metric 342 amongst the first frame certainty metric 340, $340_1$, the second frame certainty metric 340, $340_2$, and the third frame certainty metric 340, $340_3$. At block 510, the method 500 includes identifying the media device fingerprint 222, $222b_{(1-3)}$ corresponding to the greatest frame certainty metric 340 as a target media device fingerprint 222, $222_{TD}$ matching the target broadcast fingerprint 222, $222_{TB}$.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 6:
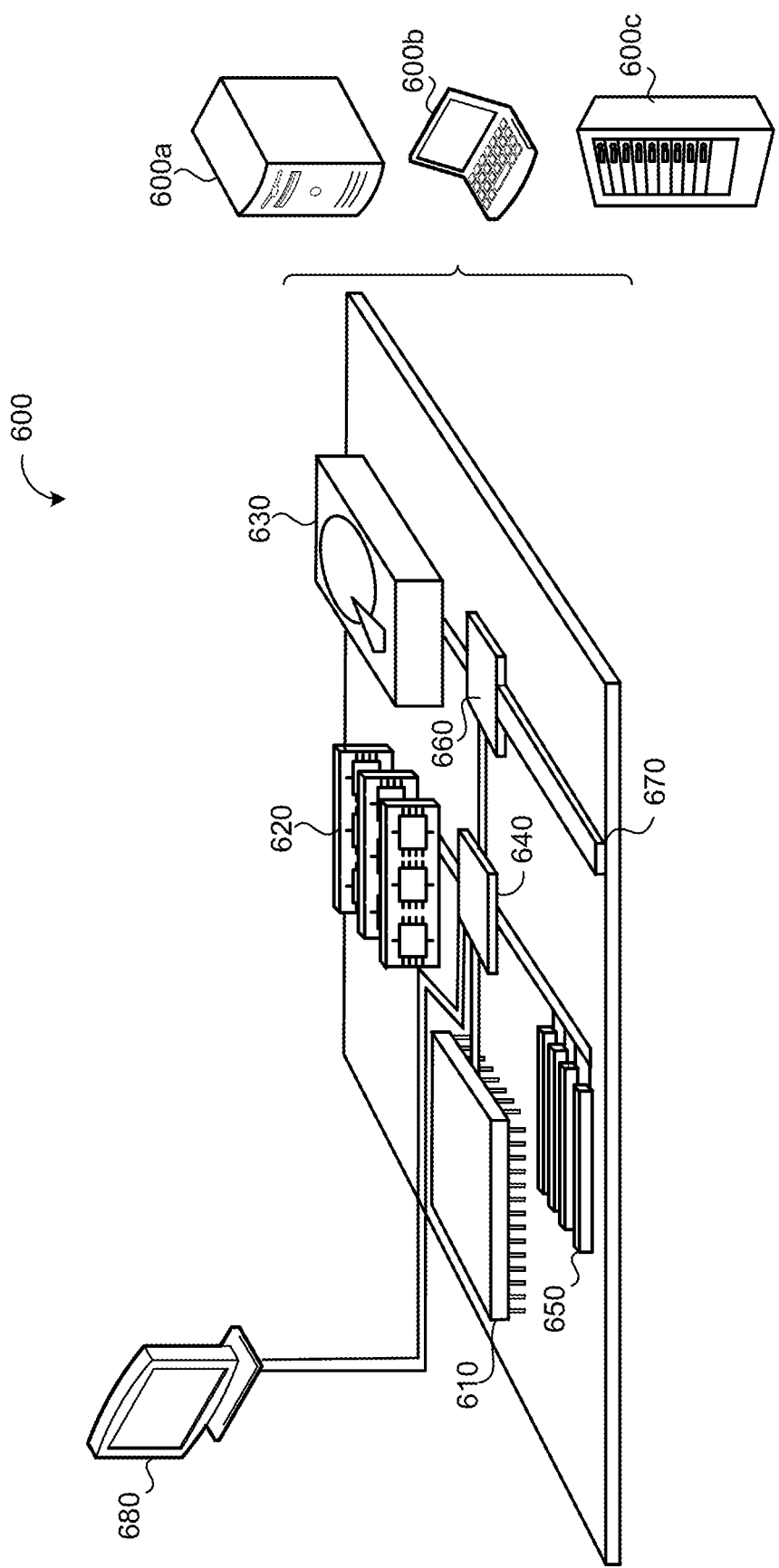
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, a memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

The invention claimed is:

1. A method comprising:
    selecting a first sequence of frames of a media device stream for replacement by a second sequence of frames;
    determining that replacement of the first sequence of frames with the second sequence of frames occurred too late such that at least a first frame of the first sequence of frames is displayed prior to a remaining portion of the first sequence of frames being replaced by the second sequence of frames; and
    based on the determining, causing replacement of a portion of the first sequence of frames that does not include the first frame with a truncated portion of the second sequence of frames such that the truncated portion of the second sequence of frames does not overrun a duration of the first sequence of frames within the media device stream.

2. The method of claim 1, wherein the determining comprises determining that it is too late to replace three frames of the first sequence of frames prior to playback of the three frames.

3. The method of claim 1, wherein the first sequence of frames includes frames of an advertisement.

4. The method of claim 1, further comprising causing playback of a third sequence of frames after playback of the truncated portion of the second sequence of frames.

5. The method of claim 4, wherein the third sequence of frames includes frames of live programming.

6. The method of claim 1, wherein the second sequence of frames includes frames of an advertisement.

7. The method of claim 1, wherein the truncated portion of the second sequence of frames includes an initial frame of the second sequence of frames but does not include a final frame of the second sequence of frames.

8. A computing device comprising:
    a processor; and
    a computer readable medium storing instructions that, when executed by the processor, cause the computing device to perform functions comprising:
        selecting a first sequence of frames of a media device stream for replacement by a second sequence of frames;
        determining that replacement of the first sequence of frames with the second sequence of frames occurred too late such that at least a first frame of the first sequence of frames is displayed prior to a remaining portion of the first sequence of frames being replaced by the second sequence of frames; and
        based on the determining, causing replacement of a portion of the first sequence of frames that does not include the first frame with a truncated portion of the second sequence of frames such that the truncated portion of the second sequence of frames does not overrun a duration of the first sequence of frames within the media device stream.

9. The computing device of claim 8, wherein the determining comprises determining that it is too late to replace three frames of the first sequence of frames prior to playback of the three frames.

10. The computing device of claim 8, wherein the first sequence of frames includes frames of an advertisement.

11. The computing device of claim 8, the functions further comprising causing playback of a third sequence of frames after playback of the truncated portion of the second sequence of frames.

12. The computing device of claim 11, wherein the third sequence of frames includes frames of live programming.

13. The computing device of claim 8, wherein the second sequence of frames includes frames of an advertisement.

14. The computing device of claim 8, wherein the truncated portion of the second sequence of frames includes an initial frame of the second sequence of frames but does not include a final frame of the second sequence of frames.

15. A non-transitory computer readable medium storing instructions that, when executed by a computing device, cause the computing device to perform functions comprising:
    selecting a first sequence of frames of a media device stream for replacement by a second sequence of frames;
    determining that replacement of the first sequence of frames with the second sequence of frames occurred too late such that at least a first frame of the first sequence of frames is displayed prior to a remaining portion of the first sequence of frames being replaced by the second sequence of frames; and
    based on the determining, causing replacement of a portion of the first sequence of frames that does not include the first frame with a truncated portion of the second sequence of frames such that the truncated portion of the second sequence of frames does not overrun a duration of the first sequence of frames within the media device stream.

16. The non-transitory computer readable medium of claim 15, wherein the determining comprises determining that it is too late to replace three frames of the first sequence of frames prior to playback of the three frames.

17. The non-transitory computer readable medium of claim 15, wherein the first sequence of frames includes frames of an advertisement.

18. The non-transitory computer readable medium of claim 15, the functions further comprising causing playback of a third sequence of frames after playback of the truncated portion of the second sequence of frames.

19. The non-transitory computer readable medium of claim 15, wherein the second sequence of frames includes frames of an advertisement.

20. The non-transitory computer readable medium of claim 15, wherein the truncated portion of the second sequence of frames includes an initial frame of the second sequence of frames but does not include a final frame of the second sequence of frames.

\* \* \* \* \*